US012223976B2

(12) United States Patent
Zhao

(10) Patent No.: US 12,223,976 B2
(45) Date of Patent: Feb. 11, 2025

(54) METHOD FOR SELECTING OUTPUT WAVE BEAM OF MICROPHONE ARRAY

(71) Applicant: ESPRESSIF SYSTEMS (SHANGHAI) CO., LTD., Shanghai (CN)

(72) Inventor: Yang Zhao, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 235 days.

(21) Appl. No.: 17/776,541

(22) PCT Filed: Nov. 12, 2020

(86) PCT No.: PCT/CN2020/128274

§ 371 (c)(1),
(2) Date: May 12, 2022

(87) PCT Pub. No.: WO2021/093798

PCT Pub. Date: May 20, 2021

(65) Prior Publication Data

US 2022/0399028 A1 Dec. 15, 2022

(30) Foreign Application Priority Data

Nov. 12, 2019 (CN) ......................... 201911097476.0

(51) Int. Cl.
*G10L 21/0232* (2013.01)
*G10L 21/0216* (2013.01)
(Continued)

(52) U.S. Cl.
CPC ...... *G10L 21/0232* (2013.01); *G10L 21/0224* (2013.01); *G10L 25/21* (2013.01); *G10L 2021/02166* (2013.01)

(58) Field of Classification Search
CPC . G10L 21/0232; G10L 21/0224; G10L 25/21; G10L 2021/02166; G10L 2025/783;
(Continued)

(56) References Cited

U.S. PATENT DOCUMENTS 6,370,507 B1 * 4/2002 Grill ........................ G10L 19/24 704/205
6,377,920 B2 * 4/2002 Yeldener ................. G10L 25/93 704/240
(Continued)

FOREIGN PATENT DOCUMENTS

CN 101510426 A 8/2009
CN 102324237 A 1/2012
(Continued)

OTHER PUBLICATIONS

International Search Report for PCT Publication No. WO 2021093798, dated May 20, 2021.
(Continued)

*Primary Examiner* — Bhavesh M Mehta
*Assistant Examiner* — Philip H Lam
(74) *Attorney, Agent, or Firm* — Aird & McBurney LP

(57) ABSTRACT

A method for estimating a direction of arrival of sound signals from a microphone array, comprising: receiving sound signals from the microphone array, and performing beamforming on the sound signals to obtain wave beams and corresponding wave beam output signals; performing the following operation on each wave beam: converting the wave beam output signal of a current wave beam to frequency domain from time domain to obtain a frequency spectrum vector and a power spectrum vector; calculating comprehensive voice signal energy of the current wave beam, wherein the comprehensive voice signal energy is the product of comprehensive energy indicating the energy level
(Continued)

of the wave beam output signal and a comprehensive voice existence probability indicating an existence probability of voice in the wave beam output signal; and selecting the wave beam with a maximal comprehensive voice signal energy value as the output wave beam.

12 Claims, 3 Drawing Sheets

(51) Int. Cl.
*G10L 21/0224* (2013.01)
*G10L 25/21* (2013.01)

(58) Field of Classification Search
CPC . G10L 21/0208; G10L 25/78; G10L 21/0216; H04R 3/005
See application file for complete search history.

(56) References Cited

U.S. PATENT DOCUMENTS

| | | | | |
|---|---|---|---|---|
| 9,613,640 | B1 * | 4/2017 | Balamurali | G10L 25/81 |
| 10,096,328 | B1 | 10/2018 | Markovich-Golan et al. | |
| 2007/0260454 | A1 * | 11/2007 | Gemello | G10L 21/0208 704/226 |
| 2012/0173234 | A1 * | 7/2012 | Fujimoto | G10L 15/20 704/E15.039 |
| 2013/0003987 | A1 * | 1/2013 | Furuta | G10L 21/0208 381/94.3 |
| 2013/0144614 | A1 * | 6/2013 | Myllyla | G10L 19/0208 381/98 |
| 2014/0074467 | A1 * | 3/2014 | Ziv | G10L 25/51 704/235 |
| 2015/0039304 | A1 * | 2/2015 | Wein | G10L 25/78 704/233 |
| 2017/0004848 | A1 * | 1/2017 | Bae | G10L 25/21 |
| 2018/0033447 | A1 * | 2/2018 | Ramprashad | G10L 25/21 |
| 2018/0090158 | A1 * | 3/2018 | Jensen | G10L 25/90 |
| 2019/0259381 | A1 * | 8/2019 | Ebenezer | H04R 3/005 |
| 2019/0385635 | A1 | 12/2019 | Shahen Tov et al. | |
| 2022/0148611 | A1 * | 5/2022 | Slapak | G10L 21/0232 |

FOREIGN PATENT DOCUMENTS

| | | | | | |
|---|---|---|---|---|---|
| CN | 102508204 | A | | 6/2012 | |
| CN | 102739886 | A | | 10/2012 | |
| CN | 103456310 | A | * | 12/2013 | |
| CN | 103871420 | A | | 6/2014 | |
| CN | 104751853 | A | * | 7/2015 | |
| CN | 105590631 | A | | 5/2016 | |
| CN | 106251877 | A | * | 12/2016 | G10L 19/032 |
| CN | 106448692 | A | | 2/2017 | |
| CN | 107976651 | A | | 5/2018 | |
| CN | 108922554 | A | | 11/2018 | |
| CN | 109346062 | A | * | 2/2019 | G10L 15/05 |
| CN | 110223708 | A | | 9/2019 | |
| CN | 110390947 | A | | 10/2019 | |
| CN | 110600051 | A | | 12/2019 | |
| JP | 6114053 | B2 | * | 4/2017 | |
| KR | 20110121319 | A | * | 11/2011 | |
| WO | 2013132926 | A1 | | 1/2013 | |
| WO | 2018133056 | A1 | | 1/2017 | |

OTHER PUBLICATIONS

Office Action with Search Report for CN Patent Application No. 201911097476.0, dates Dec. 26, 2019.

* cited by examiner

METHOD FOR SELECTING OUTPUT WAVE BEAM OF MICROPHONE ARRAY

TECHNICAL FIELD

The disclosure relates to selecting an output wave beam of a microphone array, and specifically to a method for selecting an output wave beam of a microphone array based on voice existence probability.

BACKGROUND ART

A microphone array can perform beamforming in multiple directions. However, due to the limitation of output hardware resources or application scenarios, usually only a beam in a certain direction is allowed to be selected as an output signal. The output wave beam selection of the microphone array is essentially an estimate of the direction of the source of voice signal. Correctly judging the direction of the voice signal can maximize the application effect of a beamforming algorithm; on the contrary, selecting a non-optimal wave beam as the output may greatly reduce the noise inhibitory effect of the beamforming algorithm. Therefore, in practice, the output wave beam selection mechanism, as a subsequent process to the beamforming algorithm, is of great significance to the research and development of voice signal processing systems using microphone arrays.

The inventor has noticed that while attempts have been made in the prior art to propose different methods for selecting an output wave beam of a microphone array, these existing methods still have at least the following deficiencies:

1) Relying on pre-stored speaker information or relying on wake word recognition before the direction of arrival (DOA) is recognized;
2) Difficult to simultaneously deal with high volume noise interference and low volume unstable signal interference; and
3) Not fully optimized for resource-constrained devices or application scenarios such as Internet of Things (IoT) microcontroller units (MCUs) to reduce computational complexity.

For example, Chinese Patent with the Publication No. CN103888861B discloses a method for adjusting the directivity of a microphone array, in which the method firstly receives voice information, judges the information of the pre-speaker according to the voice information, and determines the direction of the pre-speaker's location according to the judging result. In this method, it's required to store the speaker's identity information in advance, and wave beam directivity adjustment cannot be performed for unstored speakers.

For another example, the Chinese patent application with the Publication No. CN109119092A discloses a method for switching the directivity of a wave beam based on a microphone array, in which the method only utilizes the phase delay information between the microphones and the energy information of each beam, and cannot distinguish between human voice signals and non-human voice signals, therefore, it is susceptible to interference from high volume unstable noises.

For a further example, Chinese patent application with the Publication No. CN109473118A discloses a dual-channel voice enhancement method, in which the target wave beam is enhanced only according to the existence probability of the sound to be enhanced in the target wave beam, and the wave beam selection is performed based on the ratio of the voice existence probability of each wave beam therein. In practice, this method has the disadvantage of being susceptible to interference from low volume unstable signals.

For another further example, Chinese patent application with the Publication No. CN108899044A discloses a voice signal processing method, in which the correlation between the voice signals and the content is determined by utilizing the wake word existence probability, which specifically comprises firstly inputting the voice signals into the wake word engine, and obtaining the confidence levels of the voice signals output by the wake word engine, and then calculating the voice existence probability and calculating the direction of arrival of the original input signals. However, before the direction of arrival may be judged, this method relies on the wake word engine to calculate the existence probability of particular words or sentences, the realization of which relies on voice recognition technology, therefore, it can only be applied to a voice signal processing system with wake-up function. In addition, the calculation of wake word existence probability and vector operation required by the method increase the computational complexity of the method, which is not practical to be implemented on resource-constrained devices such as IoT microcontroller units (MCUs).

To sum up, there is a need in the prior art for a method for selecting an output wave beam of a microphone array to solve the above problems in the prior art. It should be understood that the technical problems listed above are only examples rather than limitations of the disclosure, and the disclosure is not limited to technical solutions that simultaneously solve all the above technical problems. The technical solutions of the disclosure may be implemented to solve one or more of the above or other technical problems.

SUMMARY OF THE INVENTION

In view of the above problems, the object of the disclosure is to provide a method for selecting an output wave beam of a microphone array, which does not rely on pre-stored speaker information, does not require wake word recognition before recognizing a direction of arrival, and can reduce both the high volume noise interference and low volume unstable signal interference, and has reduced computational complexity.

In one aspect of the disclosure, a method is provided for selecting an output wave beam of a microphone array, the method comprising the following steps: (a) receiving a plurality of sound signals from the microphone array comprising a plurality of microphones, and performing beamforming on the plurality of sound signals to obtain a plurality of wave beams and corresponding wave beam output signals; (b) performing the following operations on each wave beam in the plurality of wave beams: converting the wave beam output signal of a current wave beam from time domain to frequency domain to obtain a frequency spectrum vector and a power spectrum vector of the current wave beam; on the basis of the frequency spectrum vector and the power spectrum vector of the current wave beam, calculating an overall voice signal energy of the current wave beam, wherein the overall voice signal energy is a product of an overall energy and an overall voice existence probability of the current wave beam, wherein the overall energy indicates an energy level of the wave beam output signal of the current wave beam, the overall voice existence probability indicates an existence probability of voice in the wave beam output signal of the current wave beam, and the overall voice existence probability and the overall energy are scalar quanties; and (c) selecting a wave beam with a maximal overall voice signal energy value as an output wave beam.

Optionally, the frequency spectrum vector is obtained by performing Short-Time Fourier Transform (STFT) or Short-Time Discrete Cosine Transform (DCT) on the wave beam output signal of the current wave beam.

Optionally, in step (b), after obtaining the frequency spectrum vector and the power spectrum vector of the current wave beam, update the power spectrum vector with the frequency spectrum vector according to the following formula:

$$S_b(f,t)=\alpha_1 S_b(f,t-1)+(1-\alpha_1)|Y_b(f,t)|^2,$$

wherein t represents a frame index; f represents a frequency point; $S_b(f,t-1)$ is the power spectrum corresponding to an element of the power spectrum vector of the current wave beam at the frequency point f on frame t−1; $S_b(f,t)$ is the power spectrum corresponding to an element of the power spectrum vector of the current wave beam at the frequency point f on frame t; $\alpha_1$ is a parameter greater than 0 and less than 1; and $Y_b(f,t)$ is the frequency spectrum corresponding to an element of the frequency spectrum vector of the current wave beam at the frequency point f on frame t.

Preferably, $\alpha_1$ is greater than or equal to 0.9 and less than or equal to 0.99.

Optionally, in step (b), before calculating the overall voice signal energy of the current wave beam based on the frequency spectrum vector and the power spectrum vector of the current wave beam, determining a local energy minimum value corresponding to each element in the power spectrum vector of the current wave beam.

Optionally, determining the local energy minimum value corresponding to each element in the power spectrum vector of the current wave beam comprises: maintaining two vectors $S_{b,min}$ and $S_{b,tmp}$ with the same length as the frequency spectrum vector, and with an initial value of zero;

Each element of vectors $S_{b,min}$ and $S_{b,tmp}$ is updated according to the following formula:

$$S_{b,min}(f,t)=\min\{S_{b,min}(f,t-1),S_b(f,t)\},$$

$$S_{b,tmp}(f,t)=\min\{S_{b,tmp}(f,t-1),S_b(f,t)\},$$

wherein t represents a frame index; f represents a frequency point; $S_{b,min}(f,t)$ represents a local energy minimum value corresponding to the element of the power spectrum vector of the current wave beam at the frequency point f on frame t; $S_{b,min}(f,t-1)$ represents a local energy minimum value corresponding to the element of the power spectrum vector of the current wave beam at the frequency point f on frame t−1; $S_b(f,t)$ represents a power spectrum corresponding to the element of the power spectrum vector of the current wave beam at the frequency point f on frame t; $S_{b,tmp}(f,t)$ represents a local energy temporary minimum value corresponding to the element of the power spectrum vector of the current wave beam at the frequency point f on frame t; $S_{b,tmp}(f,t-1)$ represents a local energy temporary minimum value corresponding to the element of the power spectrum vector of the current wave beam at the frequency point f on frame t−1; and each time when L elements are updated according to the above formula, reset the vectors $S_{b,min}$ and $S_{b,tmp}$ in the following manner:

$$S_{b,min}(f,t)=\min\{S_{b,tmp}(f,t-1),S_b(f,t)\},$$

$$S_{b,tmp}(f,t)=S_b(f,t);$$

after updating each element of the vectors $S_{b,min}$ and $S_{b,tmp}$, obtain the local energy minimum value corresponding to each element in the power spectrum vector of the current wave beam.

Preferably, the L is set such that the L frames of signals comprise signals of 200 milliseconds to 500 milliseconds.

Optionally, the overall energy is obtained according to the following steps: averaging all elements of the power spectrum vector to obtain the overall energy.

Optionally, averaging all elements of the power spectrum vector to obtain the overall energy comprises:

performing weighted averaging on all elements of the power spectrum vector to obtain the overall energy, wherein for each element in the power spectrum vector, if the frequency point corresponding to the element falls in the range of 0-5 kHz, the element is given a weight of 1, otherwise it is given a weight of 0.

Optionally, the overall voice existence probability is obtained according to the following steps: for each element in a signal power spectrum vector of the current wave beam, calculating a voice existence probability corresponding to each element in the signal power spectrum vector according to a voice existence probability model, so as to generate a voice existence probability vector of the current wave beam; and perform the following steps to update each element of the voice existence probability vector of the current wave beam:

$$p_b(f,t)=\alpha_2 p_b(f,t-1)+(1-\alpha_2)I(b,f,t)$$

wherein t represents a frame index; f represents a frequency point; $p_b$ is a voice existence probability vector of the current wave beam; $p_b(f,t-1)$ is a voice existence probability corresponding to the element of the voice existence probability vector of the current wave beam at the frequency point f on frame t−1; $p_b(f,t)$ is a voice existence probability corresponding to the element of the voice existence probability vector of the current wave beam at the frequency point f on frame t; $\alpha_2$ is a parameter greater than 0 and less than 1; and the value of function I(b,f,t) is $$I(b,f,t)=\begin{cases}1, & S_b(f,t)/S_{b,min}(f,t)\geq\delta_1\\ 0, & S_b(f,t)/S_{b,min}(f,t)<\delta_1\end{cases};$$

$S_b(f,t)$ is a power spectrum corresponding to the elements of the power spectrum vector of the current wave beam; $S_{b,min}(f,t)$ is a local energy minimum value corresponding to the elements of the power spectrum vector of the current wave beam; $\delta_1$ is the threshold used to determine whether the current frame has a voice signal;

averaging all elements of the voice existence probability vector to obtain the overall voice existence probability.

Preferably, $\alpha_2$ is greater than or equal to 0.8 and less than or equal to 0.99.

Optionally, averaging all elements of the voice existence probability vector to obtain the overall voice existence probability comprises: performing weighted averaging on all elements of the voice existence probability vector to obtain the overall voice existence probability, wherein for each element in the voice existence probability vector, if the frequency point corresponding to the element falls in the range of 0-5 kHz, the element is given a weight of 1, otherwise it is given a weight of 0.

Preferably, in step (b), after calculating the overall voice signal energy of the current wave beam, update the overall voice signal energy of the current wave beam according to the following operation:

$$d_b(t)=\alpha_3 d_b(t-1)+(1-\alpha_3)J(b,t),$$

wherein $d_b$ (t−1) is the overall voice signal energy of the current wave beam on frame t−1; $d_b$ (t) is the overall voice signal energy of the current wave beam on frame t;

function J(b,t) represents the voice signal energy of the current frame, the value of which is:

$$J(b,t)=\begin{cases} e_b(t)\cdot q_b(t), & q_b(t)\geq \delta_2 \\ 0, & q_b(t)<\delta_2 \end{cases},$$

wherein $\delta_2$ is a threshold used to decide whether to set the value of function J(b,t) to zero.

Preferably, $\alpha_3$ is greater than or equal to 0.8 and less than or equal to 0.99.

The solution of the disclosure calculates the overall voice signal energy of each wave beam to select an output wave beam of the microphone array accordingly. In particular, the overall voice signal energy give sufficient consideration to the overall energy of the wave beam and the overall voice existence probability, and the wave beam selection is performed through both the wave beam energy and the voice existence probability, which does not require pre-acquisition of speaker information, and overcomes the interference of non-human noises, and also does not require any voice recognition prior to recognizing the direction of arrival. In addition, the overall voice signal energy is a product of scalar quantities, which helps reduce vector calculations and lowers computational complexity.

It should be understood that the foregoing description of the background and summary of the invention is only intended to be illustrative rather than limiting.

DETAILED DESCRIPTION OF THE PREFERRED EMBODIMENTS

The disclosure will be described more fully hereinafter with reference to the accompanying drawings, which form a part hereof, and which show exemplary embodiments by way of illustration. It should be understood that the embodiments shown in the accompanying drawings and described hereinafter are only illustrative and not intended to limit the disclosure.

Figure 1:
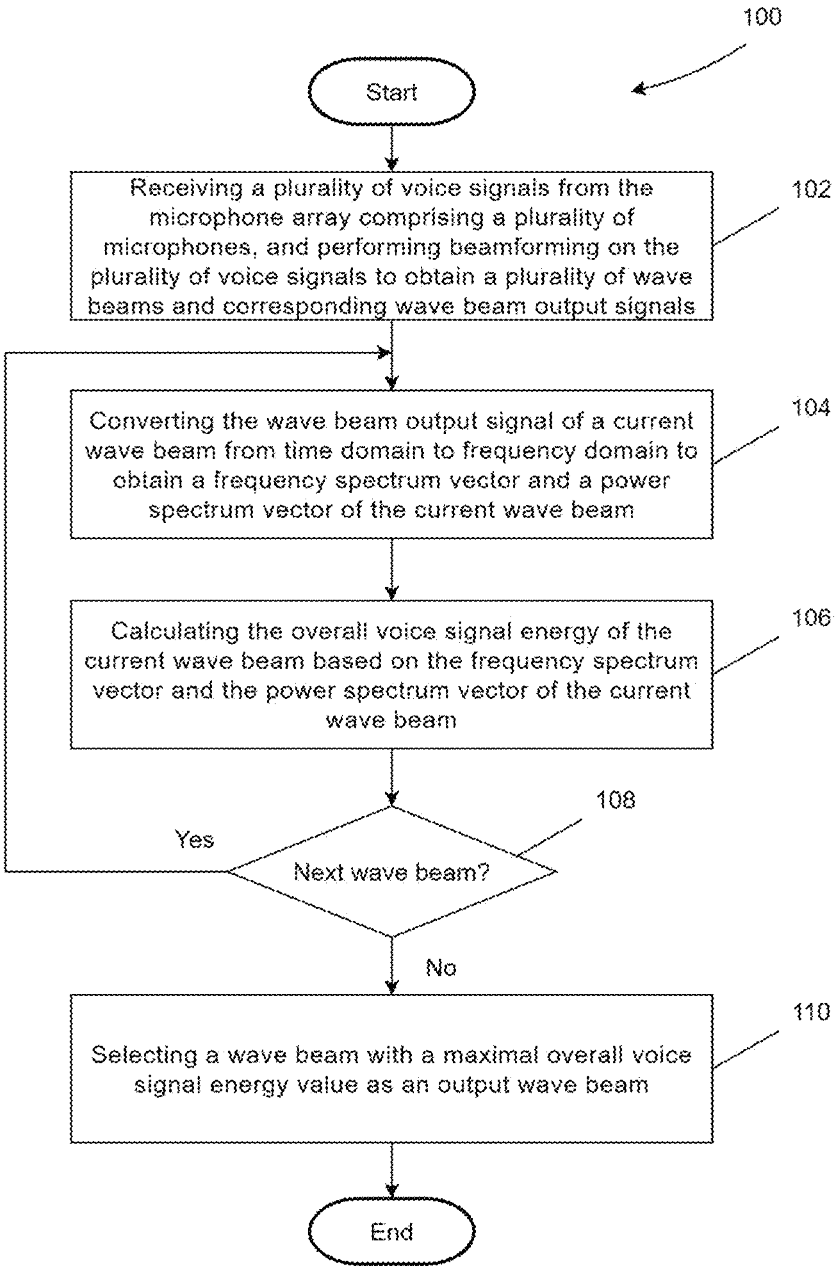
FIG. 1 is a schematic flow diagram of an exemplary embodiment of the method for selecting an output wave beam of a microphone array of the disclosure.

FIG. 1 is a schematic flow diagram of an exemplary embodiment of the method for selecting an output wave beam of a microphone array of the disclosure.

Method 100 shown in FIG. 1 comprises: (a) as shown in step 102, receiving a plurality of sound signals from the microphone array comprising a plurality of microphones, and performing beamforming on the plurality of sound signals to obtain a plurality of wave beams and corresponding wave beam output signals.

The method 100 further comprises: (b) as shown in steps 104 to 108, performing the following operations on each wave beam in the plurality of wave beams: converting the wave beam output signal of a current wave beam from time domain to frequency domain to obtain a frequency spectrum vector and a power spectrum vector of the current wave beam (step 104); on the basis of the frequency spectrum vector and the power spectrum vector of the current wave beam, calculating an overall voice signal energy of the current wave beam (step 106), wherein the overall voice signal energy is a product of an overall energy and an overall voice existence probability of the current wave beam, wherein the overall energy indicates an energy level of the wave beam output signal of the current wave beam, the overall voice existence probability indicates an existence probability of voice in the wave beam output signal of the current wave beam, and the overall voice existence probability and the overall energy are scalar quantities.

The method further comprises: (c) as shown in step 110, selecting a wave beam with a maximal overall voice signal energy value as an output wave beam.

Figure 2:
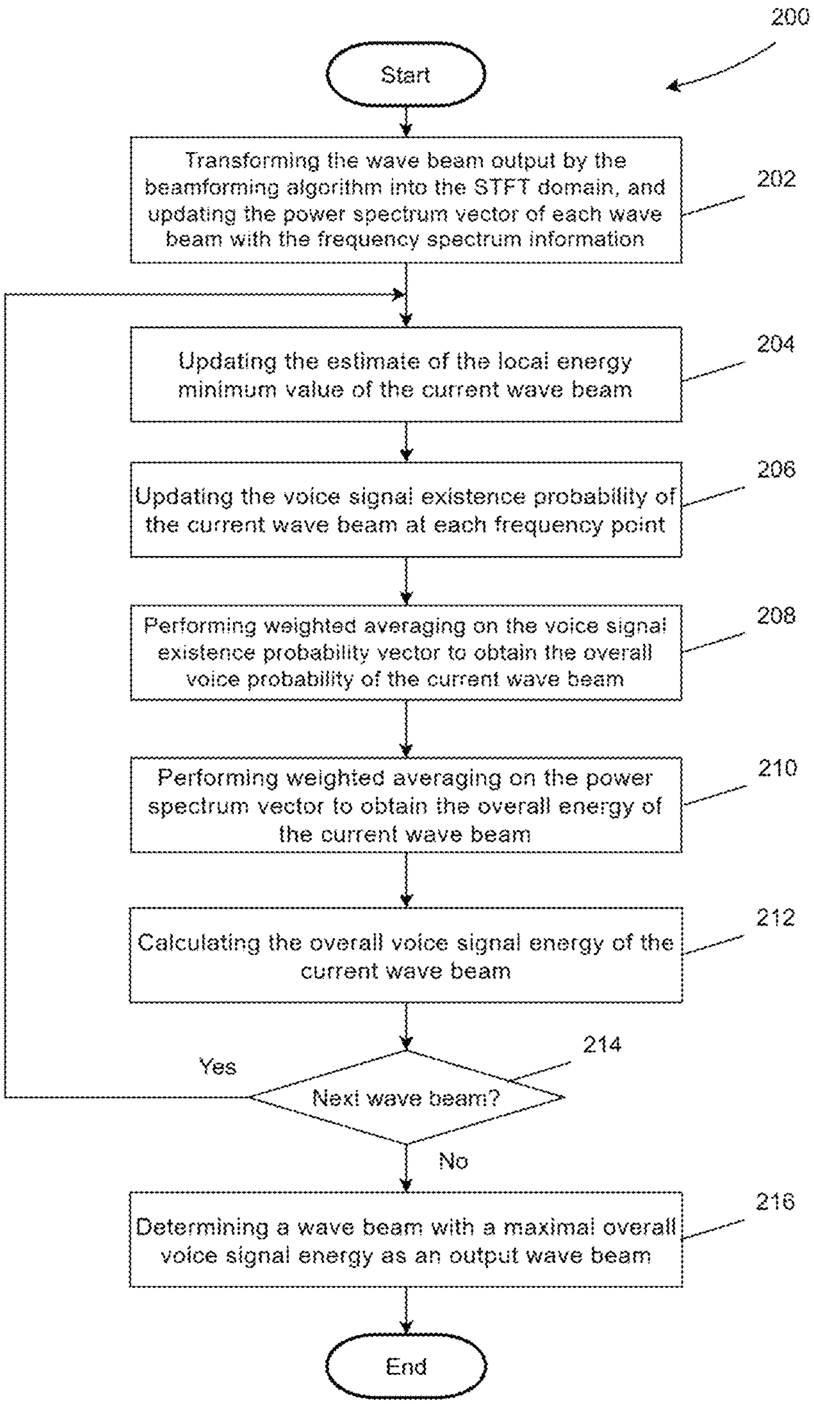
FIG. 2 is a schematic flow diagram of a detailed exemplary embodiment of the method for selecting an output wave beam of a microphone array of the disclosure.

FIG. 2 is a schematic flow diagram of a detailed exemplary embodiment of the method for selecting an output wave beam of a microphone array of the disclosure.

Method 200 begins from step 202, in which the wave beam output by the beamforming algorithm is transformed into the STFT domain, and the power spectrum vector of each wave beam is updated with the frequency spectrum information. Specifically, it is assumed that the beamforming algorithm outputs B wave beams which are transformed into Short-Time Fourier Transform (STFT) domain of F points, then the output signal of the b-th (b=1, 2, . . . , B) wave beam may be represented as an F-dimensional frequency spectrum vector $Y_b$ in the STFT domain, and the f-th element $Y_b(f)$ of the vector $Y_b$ represents the frequency information of the signal at the frequency f. The modulus is taken for each frequency point of vector $Y_b$ and weighted with the power spectrum vector $S_b$, and the latter is updated according to the following formula:

$$S_b(f,t)=\alpha_1 S_b(f,t-1)+(1-\alpha_1)|Y_b(f,t)|^2$$

wherein the independent variable t represents time (i.e., frame index), for example, $S_b$(f,t−1) and $S_b$(f,t) represent the value of $S_b$ at the frequency point f on frame t−1 and the value of $S_b$ at the frequency point f on frame t, respectively, and the vectors such as and $S_{b,tmp}$ hereinafter also adopt the above manner of representation. The parameter $a_1$ is between 0 and 1, the larger the value, the smaller the update degree of the power spectrum, which may better resist the influence of transient noise, but it may be more likely to mismatch with the real current instantaneous energy value, and the preferred values is between 0.9 to 0.99.$|Y_b(f)|^2$, the modulus of vector $Y_b$ on the frequency f represents the power spectrum of the current frame (that is, frame t, the same below) of signal on the frequency by updating $S_b$(f) with $|Y_b(f)|^2$, the latter still represents the same physical meaning (signal energy) as the former, but because it is updated smoothly, it may better resist the influence of transient noises. Preferably, the subsequent steps may be calculated using the updated power spectrum vector, so that the system is relatively stable.

Figure 3:
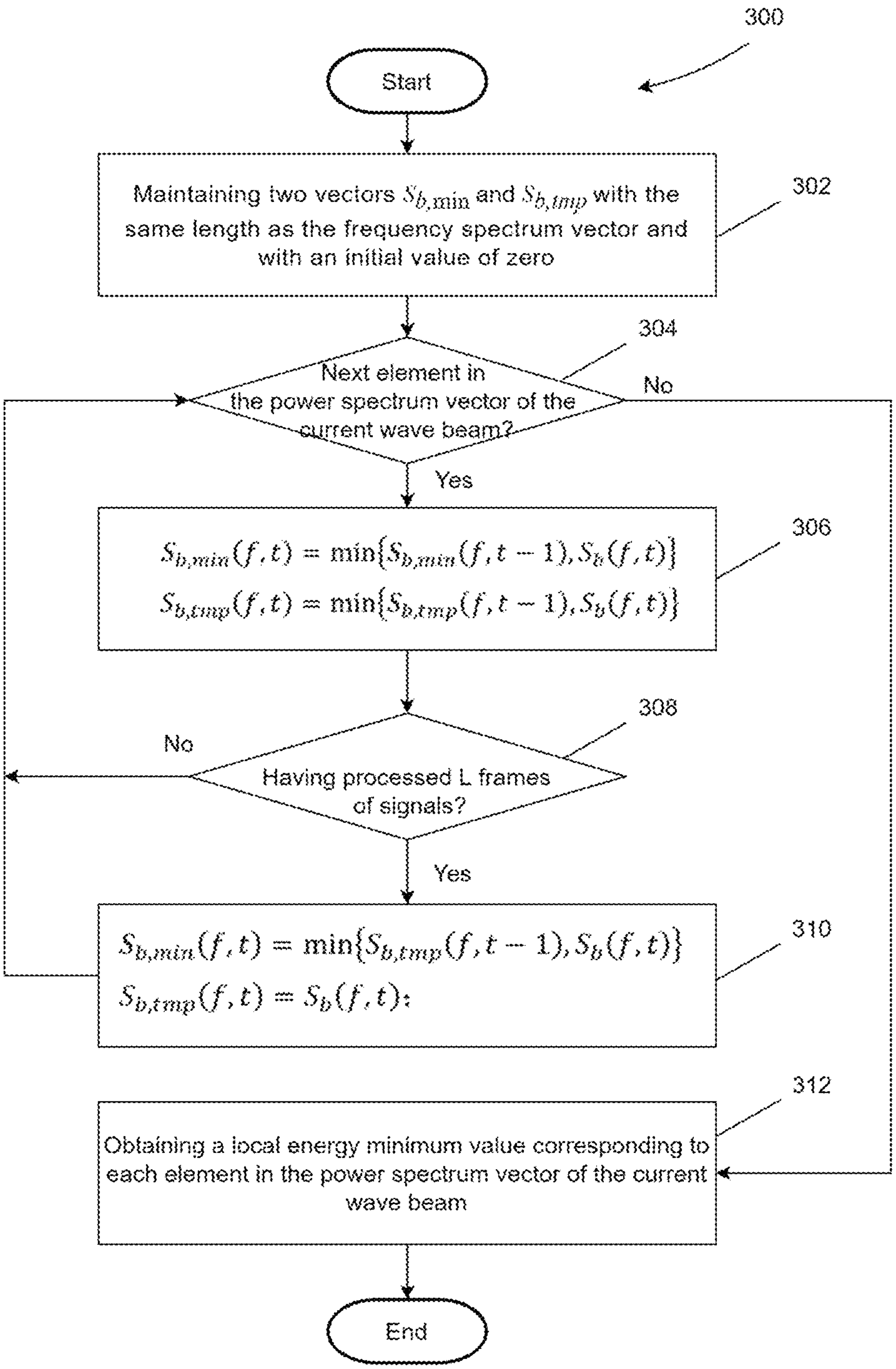
FIG. 3 is a schematic flow diagram of updating the local energy minimum value estimate in an embodiment of the method for selecting an output wave beam of a microphone array of the disclosure.

In step 204, update the estimate of the local energy minimum value $S_{b,min}$ of the current wave beam. For example, the local energy minimum value estimate may be updated according to the method 300 shown in FIG. 3. It should be understood that although FIG. 3 illustrates a specific method, the implementation of the disclosure is not limited thereto. For example, Martin, R.: Spectral subtraction based on minimum statistics. 1994, *Proceedings of* $7^{th}$ *EUSIPCO,* 1182-1185 or a variant of this method may be used to update the estimate of the local energy minimum value $S_{b,min}$ of the current wave beam.

In step 302, maintain two vectors $S_{b,min}$ and $S_{b,tmp}$ with a length of F (the initial value is 0, that is, the formula $S_{b,min}(f,0)=S_{b,tmp}(f,0)=0$ is for all f).

In step 304, determine whether a next element exists in the power spectrum vector of the current wave beam $S_b$. If yes, go to step 306; if no, which means that each element of the power spectrum vector of the current wave beam has been processed, go to step 312, and obtain the local minimum energy value corresponding to each element.

In step 306, update the current element corresponding to each frequency point in the following manner, $$S_{b,min}(f,t)=\min\{S_{b,min}(f,t-1),S_b(f,t)\},$$

$$S_{b,tmp}(f,t)=\min\{S_{b,tmp}(f,t-1),S_b(f,t)\},$$

In step 308, judge whether L frames of signals have been processed, that is, judge whether t is a multiple of L or not. Each time when L frames of signals are processed, in step 310, reset $S_{b,min}$ and $S_{b,tmp}$ in the following manner, $$S_{b,min}(f,t)=\min\{S_{b,tmp}(f,t-1)S_b(f,t)\}$$

$$S_{b,tmp}(f,t)=S_b(f,t);$$

in which the vector $S_{b,min}$ is local (L frames of signals) minimum value. Since at any time, the signal must be noise or the addition of noise and voice, it can be considered approximately that $S_{b,min}$ represents the intensity of noise energy. This method is essentially based on the assumption that the voice signal is an unstable signal and the noise is a stable signal. The smaller the value of L, the lower the requirement for the stability of noise, but the smaller the discrimination between the noise signal and the voice signal; the value of this parameter is also related to the length setting of each frame of signal. In preferred embodiments of the disclosure, the L frames of signals should be approximately made to contain signals of 200 milliseconds to 500 milliseconds.

Returning to FIG. 2, in step 206, update the voice existence probability of the current wave beam at each frequency point. Specifically, the probability of the existence of the voice signal at each frequency point may be represented using a vector $p_b$, and is updated in the following manner, $$p_b(f\,t)=\alpha_2 p_b(f,t-1)+(1-\alpha_2)I(b,f,t)$$

wherein the parameter $\alpha_2$ is between 0 and 1, and the recommended setting is 0.8 to 0.99;

The value of function I(b,f) is $$I(b,f,t)=\begin{cases}1, & S_b(f,t)/S_{b,min}(f,t)\ge\delta_1\\ 0, & S_b(f,t)/S_{b,min}(f,t)<\delta_1\end{cases};$$

wherein parameter $\delta_1$ represents the threshold used to determine whether the current frame has a voice signal.

It should be understood that step 206 may be implemented using the method of Cohen, I. and Berdugo, B.: Noise estimation by minima controlled recursive averaging for robust speech enhancement. 2002, *IEEE Signal Processing Letters,* 9(1): 12-15 or its variants, and other algorithms for probability estimation of voice signals. Similarly, the input to the algorithm is required to be the signal power spectrum $S_b$, and the output is the voice probability $p_b$ between 0 and 1.

In step 208, perform weighted averaging on the voice existence probability vector to obtain the overall voice probability of the current wave beam. Specifically, weighted averaging on the vector $p_b$ is performed. Give a weight of 1 to the frequency points in the range of 0-5 kHz, otherwise give a weight of 0, to obtain the overall voice existence probability $q_b$ of wave beam b. A scalar quantity $q_b$ will be used in subsequent steps instead of a vector $p_b$, which will simplify the calculations; at the same time, since it is almost impossible for the frequency of human voice to exceed 5 kHz, it can be considered that discarding the signals above this frequency will not affect the final result.

In step 210, perform weighted averaging on the power spectrum vector to obtain the overall energy of the current wave beam. Similarly, perform the same weighted averaging on the vector $S_b$ to obtain the overall energy $e_b$ of wave beam b. Specifically, weighted averaging is performed on the vector $S_b$. A weight of 1 is given to frequency points in the range of 0-5 kHz, otherwise a weight of 0 is given.

In step 212, calculate the overall voice signal energy of the current wave beam. $d_b$ is defined as the voice signal energy of wave beam b, the initial value of which is 0 (i.e., $d_b(0)=0$), update each frame in the following manner:

$$d_b(t)=\alpha_3 d_b(t-1)+(1-\alpha_3)J(b,t)$$

The parameter $\alpha_3$ is between 0 and 1, and the recommended setting is 0.8 to 0.99. The function J(b) represents the voice signal energy of the current frame, the value of which is $$J(b,t)=\begin{cases}e_b(t)\cdot q_b(t), & q_b(t)\ge\delta_2\\ 0, & q_b(t)<\delta_2\end{cases},$$

in which parameter $\delta_2$ is a threshold used to decide whether to set the function value to zero.

In step 214, determine whether a next wave beam exists. If yes, go back to step 204, and execute steps 204-212 for the next wave beam; if not, go to step 218.

In step 218, a wave beam with a maximal overall voice signal energy is determined and selected as an output wave beam. Specifically, take wave beam b corresponding to the maximum value in overall voice signal energy set $\{d_b\}(b=1, 2, \ldots, B)$ as an output wave beam.

The above embodiments provide specific operation processes by way of example, but it should be understood that the protection scope of the disclosure is not limited thereto.

While various embodiments of various aspects of the invention have been described for the purpose of the disclosure, it shall not be understood that the teaching of the disclosure is limited to these embodiments. The features disclosed in a specific embodiment are therefore not limited to that embodiment, but may be combined with the features disclosed in different embodiments. Furthermore, it should be understood that the method steps described above may be performed sequentially, performed in parallel, combined into fewer steps, split into more steps, combined and/or omitted in ways other than those described. Those skilled in the art should appreciate that there are possibly more optional embodiments and modifications and various changes and modifications may be made to the above components and configurations, without departing from the scope defined by the claims of the disclosure.

The invention claimed is:

1. A method for estimating a direction of arrival of sound signals from a microphone array, comprising the following steps:

(a) receiving a plurality of sound signals from the microphone array comprising a plurality of microphones, and performing beamforming on the plurality of sound signals to obtain a plurality of wave beams and corresponding wave beam output signals;

(b) performing the following operations on each wave beam in the plurality of wave beams:

converting the wave beam output signal of a current wave beam from time domain to frequency domain to obtain a frequency spectrum vector and a power spectrum vector of the current wave beam;

on the basis of the frequency spectrum vector and the power spectrum vector of the current wave beam, calculating an overall voice signal energy of the current wave beam, wherein the overall voice signal energy is a product of an overall energy and an overall voice existence probability of the current wave beam, wherein the overall energy indicates an energy level of the wave beam output signal of the current wave beam, the overall voice existence probability indicates an existence probability of voice in the wave beam output signal of the current wave beam, and the overall voice existence probability and the overall energy are scalar quantities; wherein the overall energy is obtained according to the following steps: averaging all elements of the power spectrum vector to obtain the overall energy; and the averaging comprises: performing weighted averaging on all elements of the power spectrum vector to obtain the overall energy, wherein for each element in the power spectrum vector, if the frequency point corresponding to the element falls in the range of 0-5 kHz, the element is given a weight of 1, otherwise it is given a weight of 0;

(c) selecting a wave beam with a maximal overall voice signal energy value as an output wave beam; and (d) estimating the direction of arrival of sound signals from the microphone array based on a direction of the output wave beam.

2. The method of claim 1, wherein the frequency spectrum vector is obtained by performing Short-Time Fourier Transform (STFT) or Short-Time Discrete Cosine Transform (DCT) on the wave beam output signal of the current wave beam.

3. The method of claim 1, wherein, in step (b), after obtaining the frequency spectrum vector and the power spectrum vector of the current wave beam, update the power spectrum vector with the frequency spectrum vector according to the following formula:

$$S_b(f,t)=\alpha_1 S_b(f,t-1)+(1-\alpha_1)|Y_b(f,t)|^2,$$

wherein:

t represents a frame index;

f represents a frequency point;

$S_b(f,t-1)$ is a power spectrum corresponding to an element of the power spectrum vector of the current wave beam b at the frequency point f on frame t−1;

$S_b(f,t)$ is a power spectrum corresponding to an element of the power spectrum vector of the current wave beam b at the frequency point f on frame t;

$\alpha_1$ is a parameter greater than 0 and less than 1; and $Y_b(f,t)$ is a frequency spectrum corresponding to an element of the frequency spectrum vector of the current wave beam b at the frequency point f on frame t.

4. The method of claim 3, wherein $\alpha_1$ is greater than or equal to 0.9 and less than or equal to 0.99.

5. The method of claim 1, wherein, in step (b), before calculating the overall voice signal energy of the current wave beam based on the frequency spectrum vector and the power spectrum vector of the current wave beam, determine a local energy minimum value corresponding to each element in the power spectrum vector of the current wave beam.

6. The method of claim 5, wherein determining the local energy minimum value corresponding to each element in the power spectrum vector of the current wave beam comprises:

maintaining two vectors $S_{b,min}$ and $S_{b,tmp}$ with the same length as the frequency spectrum vector and with an initial value of zero;

each element of vectors $S_{b,min}$ and $S_{b,tmp}$ is updated according to the following formula:

$$S_{b,min}(f,t)=\min\{S_{b,min}(f,t-1),S_b(f,t)\},$$

$$S_{b,tmp}(f,t)=\min\{S_{b,tmp}(f,t-1),S_b(f,t)\},$$

wherein:

t represents a frame index;

f represents a frequency point;

$S_{b,min}(f,t)$ represents a local energy minimum value corresponding to the element of the power spectrum vector of the current wave beam b at the frequency point f on frame t;

$S_{b,min}(f,t-1)$ represents a local energy minimum value corresponding to the element of the power spectrum vector of the current wave beam b at the frequency point f on frame t−1;

$S_b(f,t)$ represents a power spectrum corresponding to the element of the power spectrum vector of the current wave beam b at the frequency point f on frame t;

$S_{b,tmp}(f,t)$ represents a local energy temporary minimum value corresponding to the element of the power spectrum vector of the current wave beam b at the frequency point f on frame t;

$S_{b,tmp}$ (f,t−1) a local energy temporary minimum value corresponding to the element of the power spectrum vector of the current wave beam b at the frequency point f on frame t−1; and each time when L elements are updated according to the above formula, reset the vectors $S_{b,min}$ and $S_{b,tmp}$ in the following manner:

$$S_{b,min}(f,t)=\min\{S_{b,tmp}(f,t-1),S_b(f,t)\},$$

$$S_{b,tmp}(f,t)=S_b(f,t);$$

after updating each element of the vectors $S_{b,min}$ and $S_{b,tmp}$, obtain the local energy minimum value corresponding to each element in the power spectrum vector of the current wave beam b.

7. The method of claim 6, wherein the L is set such that the L frames of signals comprise signals of 200 milliseconds to 500 milliseconds.

8. The method of claim 1, wherein, the overall voice existence probability is obtained according to following steps:

for each element in a signal power spectrum vector of the current wave beam, calculating a voice existence probability corresponding to each element in the signal power spectrum vector according to a voice existence probability model, so as to generate a voice existence probability vector of the current wave beam; and performing the following steps to update each element of the voice existence probability vector of the current wave beam:

$$p_b(f,t)=\alpha_2 p_b(f,t-1)+(1-\alpha_2)I(b,f,t)$$

wherein:

t represents a frame index;

f represents a frequency point;

$p_b$ is a voice existence probability vector of the current wave beam b;

$p_b(f,t-1)$ is a voice existence probability corresponding to the element of the voice existence probability vector of the current wave beam b at the frequency point f on frame t−1;

$p_b(f,t)$ is a voice existence probability corresponding to the element of the voice existence probability vector of the current wave beam b at the frequency point f on frame t;

$\alpha_2$ is a parameter greater than 0 and less than 1; and the value of function/(b,f,t) is $$I(b,f,t)=\begin{cases}1, & S_b(f,t)/S_{b,min}(f,t)\geq\delta_1\\ 0, & S_b(f,t)/S_{b,min}(f,t)<\delta_1\end{cases};$$

$S_b(f,t)$ is a power spectrum corresponding to the elements of the power spectrum vector of the current wave beam b;

$S_{b,min}(f,t)$ is a local energy minimum value corresponding to the elements of the power spectrum vector of the current wave beam b;

$\delta_1$ is a threshold used to determine whether the current frame has a voice signal;

averaging all elements of the voice existence probability vector to obtain the overall voice existence probability.

9. The method of claim 8, wherein $\alpha_2$ is greater than or equal to 0.8 and less than or equal to 0.99.

10. The method of claim 8, wherein averaging all elements of the voice existence probability vector to obtain the overall voice existence probability comprises:

performing weighted averaging on all elements of the voice existence probability vector to obtain the overall voice existence probability, wherein for each element in the voice existence probability vector, if the frequency point corresponding to the element falls in the range of 0-5 kHz, the element is given a weight of 1, otherwise it is given a weight of 0.

11. The method of claim 1, wherein, in step (b), after calculating the overall voice signal energy of the current wave beam, update the overall voice signal energy of the current wave beam according to the following operation:

$$d_b(t)=\alpha_3 d_b(t-1)+(1-\alpha_3)J(b,t),$$

wherein:

$d_b(t-1)$ is the overall voice signal energy of the current wave beam on frame t−1;

$d_b(t)$ is the overall voice signal energy of the current wave beam on frame t;

$\alpha_3$ is a parameter greater than 0 and less than 1;

function J(b,t) represents the voice signal energy of the current frame, the value of which is:

$$J(b,t)=\begin{cases}e_b(t)\cdot q_b(t), & q_b(t)\geq\delta_2\\ 0, & q_b(t)<\delta_2\end{cases},$$

wherein $\delta_2$ is a threshold used to decide whether to set the value of function J(b,t) to zero;

$e_b(t)$ is the overall energy of wave beam b on frame t; and $q_b(t)$ is the overall voice existence probability of wave beam b on frame t.

12. The method of claim 11, wherein $\alpha_3$ is greater or equal to 0.8 and less than or equal to 0.99.

* * * * *